(12) United States Patent
Kim

(10) Patent No.: US 7,896,429 B2
(45) Date of Patent: Mar. 1, 2011

(54) CONSTRUCTION EQUIPMENT CAB HAVING PROTECTIVE STRUCTURE

(75) Inventor: Kang Tae Kim, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 12/491,350

(22) Filed: Jun. 25, 2009

(65) Prior Publication Data
US 2009/0256393 A1 Oct. 15, 2009

(30) Foreign Application Priority Data
Jul. 4, 2008 (KR) ...................... 10-2008-0064973

(51) Int. Cl.
*B62D 33/06* (2006.01)
(52) U.S. Cl. ................................. 296/193.07
(58) Field of Classification Search ............. 296/190.03
See application file for complete search history.

(56) References Cited

U.S. PATENT DOCUMENTS 3,841,430 A * 10/1974 Babbitt et al. ............ 180/89.12
3,940,177 A * 2/1976 Miers et al. ................ 296/35.1

\* cited by examiner

*Primary Examiner*—Dennis H Pedder
(74) *Attorney, Agent, or Firm*—Ladas & Parry LLP

(57) ABSTRACT

Provided is a construction equipment cab having a protective structure capable of protecting an operator from injury due to deformation of a cab in the event of a rollover accident. The construction equipment cab is mounted on an upper swivel body, and the protective structure is mounted on the cab and the upper swivel body and protects an operator from the cab in a rollover accident. The construction equipment cab includes a lower panel provided at a rear lower portion of the cab to be sunk in a forward direction in order to secure a space in which the protective structure is held, and a unit for fixing the protective structure held in the space to the upper swivel body and the cab.

2 Claims, 4 Drawing Sheets

CONSTRUCTION EQUIPMENT CAB HAVING PROTECTIVE STRUCTURE

CROSS REFERENCE TO RELATED APPLICATIONS

This application claims priority from Korean Patent Application No. 10-2008-0064973, filed on Jul. 4, 2008, which is incorporated herein by reference in its entirety.

BACKGROUND OF THE INVENTION

1. Field of the Invention

The present invention relates to a construction equipment cab having a protective structure capable of ensuring the safety of an operator from cab deformation in the event of a rollover accident More particularly, the present invention is concerned with a construction equipment cab having a protective structure (e.g., Roll Over Protective Structure; ROPS) mounted at the rear of the cab to protect an operator from injury due to deformation of the cab in the event of a rollover accident, the cab being capable of preventing the protective structure from protruding outwardly from the rear of the cab, simplifying a structure of the protective structure, and effectively dispersing a load transmitted to the construction equipment cab in a rollover accident.

2. Description of the Related Art

In case a frame-shaped protective structure is directly mounted in the front of a cabin (simply called a cab) of construction equipment such as bulldozers, snowplows, backhoes, etc., the cab is generally vulnerable to a load applied to the sides or rear thereof. For example, when there is a rollover accident on a slope, or when sudden load is applied to a cab by a heavy object, the cab is damaged or is excessively deformed, which may result in injury to a driver or operator.

For that reason, several protective structures have been prescribed. A Roll Over Protective Structure (ROPS) is intended to prevent a cab of construction equipment, which is deformed when the construction equipment rolls over, from coming into contact with the body of an operator. A Falling Object Protective Structure (FOPS) is intended to prevent both a cab of construction equipment that is deformed when a heavy object falls onto the cab during work, and the heavy object itself, from coming into contact with the body of an operator. A Tip Over Protective Structure (TOPS) is intended to prevent both a cab of construction equipment that is deformed when a heavy object collides with the side or rear of the cab during work, and the heavy object itself, from coming into contact with the body of an operator.

These protective structures for the cab are designed to reinforce the strength of the front, rear or top of the cab such that the cab does not deform so much as to invade the space of the operator in an accident.

In a conventional construction equipment cab having a protective structure as shown in FIGS. 1 and 2, the cab 2 is mounted on an upper swivel body I (on top of a lower travelling body (not shown)), and the protective structure 3 is fixed to the upper swivel body 1 and an outer face of the cab 2 such that a driver or operator can be protected from injury due to deformation of the cab 2 when the construction equipment rolls over.

The protective structure 3 is fixed to the upper swivel body 1 at a lower end thereof by bolts 4. Fastening members 5 fixed to an upper end of the protective structure 3 are coupled to coupling holes of hooks 6, which are formed on a rear outer face of the cab 2 to be opposite to each other, and then are fastened by fastening plates 7 screwed thereto.

This protective structure 3 is composed of vertical members 3a and horizontal members 3b, and protrudes backward from the cab 2, so that it is impossible to secure sufficient space to mount a radiator 8, a battery, etc. in the rear of the cab 2. (Particularly, in the case of zero tail type construction equipment in which a door 2a of the cab 2 can swing open and closed, there is insufficient space in the rear of the cab 2.)

Further, when the cab 2 is assembled on an assembly line, the fastening members 5 fixed to the upper end of the protective structure 3 are inserted into the coupling holes (formed in a vertical direction) of the horizontal hooks 6. Then, the lower end of the protective structure 3 is fixed to the upper swivel body 1 by the bolts 4, and the upper end of the protective structure 3 is fastened to the hooks 6 by the fastening plates 7. As a result, more time is required to assemble the cab 2 so that work efficiency falls.

Further, the members that fix the protective structure 3 to the cab 2 have a complicated structure, which increases the number of parts so that production cost increases.

Furthermore, in the case in which the weight of the construction equipment is transmitted to the side, etc. of the cab 2 due to a rollover accident during work, a load is transmitted to the fastening members 5 via the protective structure 3. Thus, the load is not effectively dispersed, the protective structure 3 is deformed or damaged, and impact is directly transmitted to the operator, which amounts to reduced safety and reliability.

SUMMARY OF THE INVENTION

The present invention is directed to a construction equipment cab having a protective structure that is prevented from protruding backward from the cab, thereby making it possible to easily mount a radiator, etc. even in a narrow space in the rear of the cab of for instance, construction equipment whose door can swing open and closed.

The present invention is also directed to a construction equipment cab having a protective structure cable of improving workability when assembled on an assembly line due to simplification of configuration of the protective structure connected to the cab.

The present invention is also directed to a construction equipment cab having a protective structure, in which, when the weight of construction equipment is transmitted to the side, etc. of the cab due to a rollover accident during work, a load is dispersed to the sides or top of the protective structure, thereby making it possible to minimize impact transmitted to an operator.

According to an aspect of the present invention, there is provided a construction equipment cab having a protective structure, in which the construction equipment cab is mounted on an upper swivel body, and the protective structure is mounted on the cab and the upper swivel body and protects an operator from the cab in a rollover accident. The construction equipment cab includes: a lower panel provided at a rear lower portion of the cab to be sunk in a forward direction in order to secure a space in which the protective structure is held; and means for fixing the protective structure held in the space to the upper swivel body and the cab.

In an exemplary embodiment of the present invention, the fixing means may include: first fixing members for fixing a lower end of the protective structure to the upper swivel body; a pair of hooks vertically fixed to a rear outer face of the cab to be opposite to each other, and each having a coupling hole formed in a horizontal direction; brackets vertically installed on upper ends of the protective structure to support the hooks on left and right sides of the cab; and second fixing members coupled to the coupling holes horizontally formed in the hooks and the brackets to fix the protective structure to the cab.

In an exemplary embodiment of the present invention, the lower panel may be inclined upwardly toward the rear of the cab at an upper portion thereof.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Exemplary embodiments of the present invention will be explained below in detail so that one skilled in the art may easily work the invention. However, the following description is not intended to limit the technical ideas or scope of the present invention.

Figure 1:
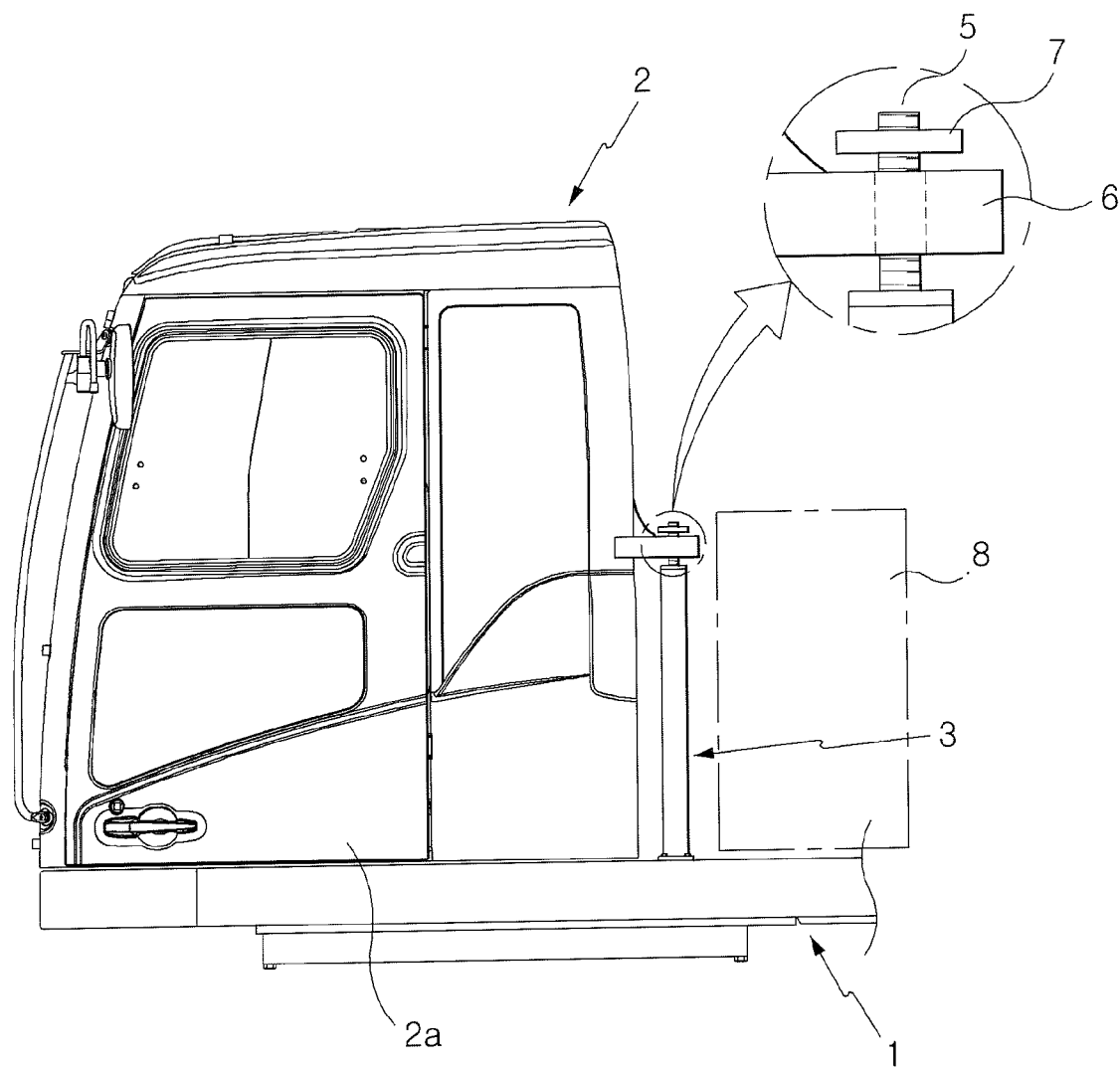
FIG. 1 is a schematic side view of a conventional construction equipment cab having a protective structure.
Figure 2:
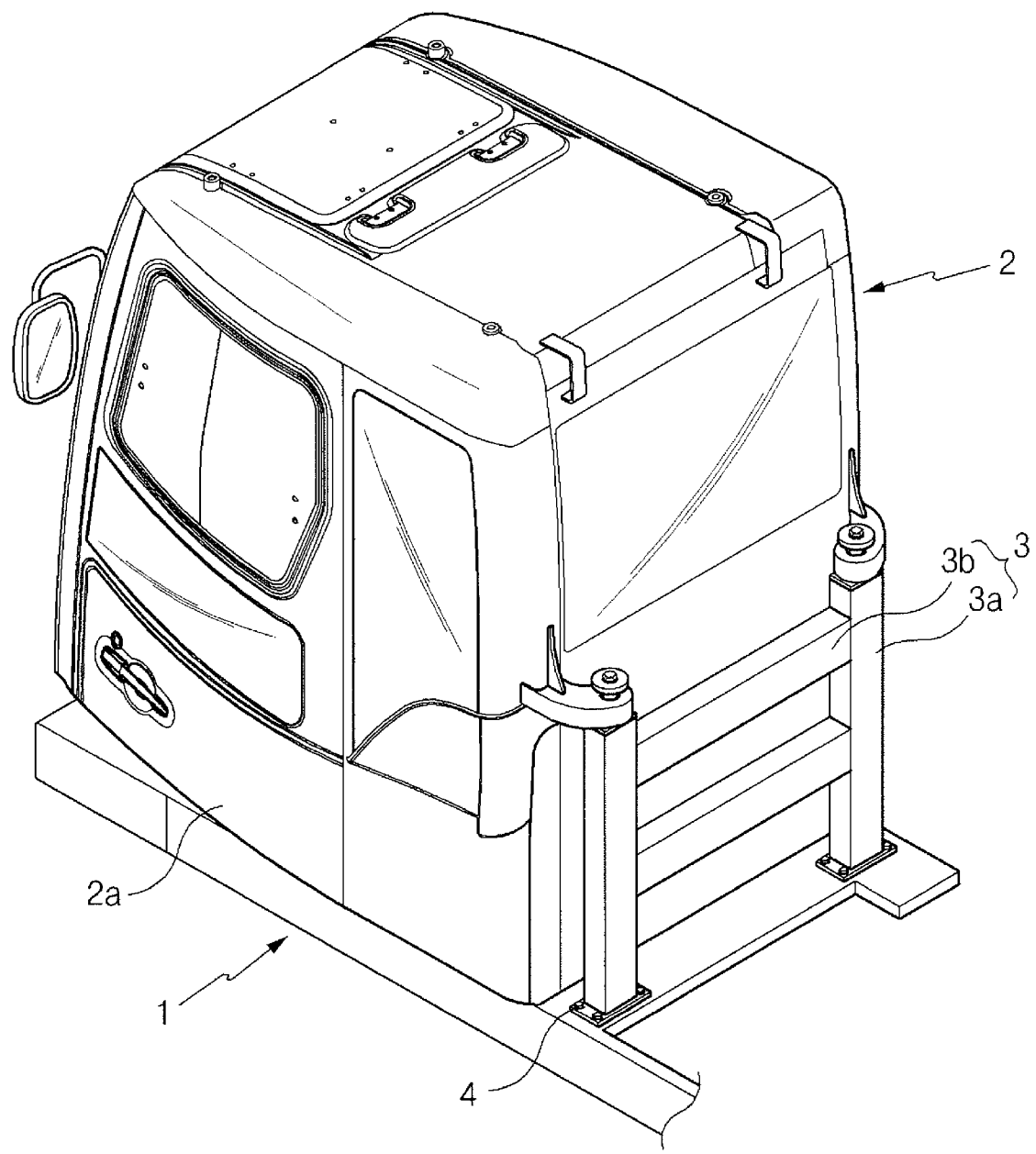
FIG. 2 is a perspective view of the construction equipment cab shown in FIG. 1.
Figure 3:
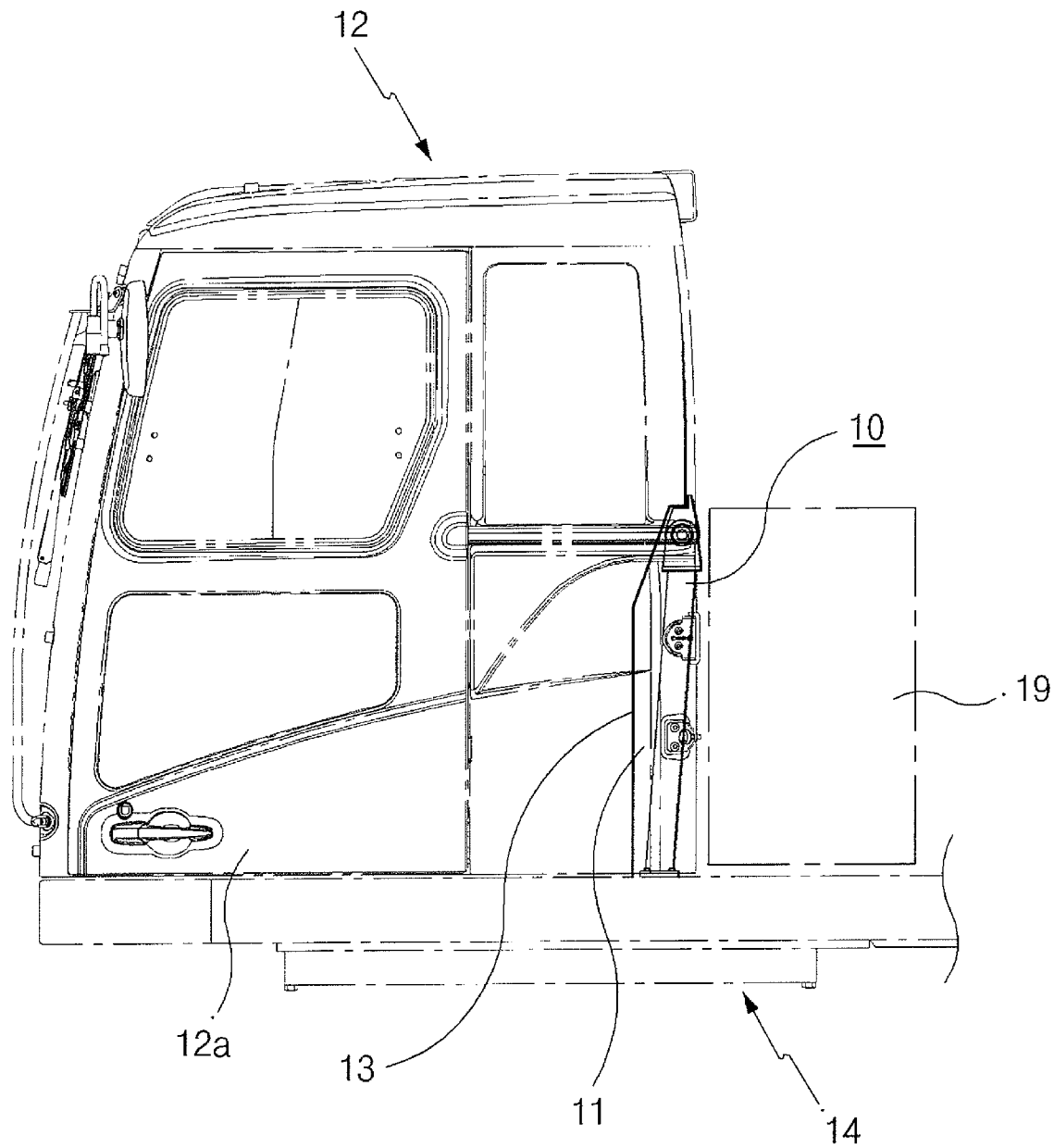
FIG. 3 is a schematic side view of a construction equipment cab having a protective structure in accordance with an exemplary embodiment of the present invention.
Figure 4:
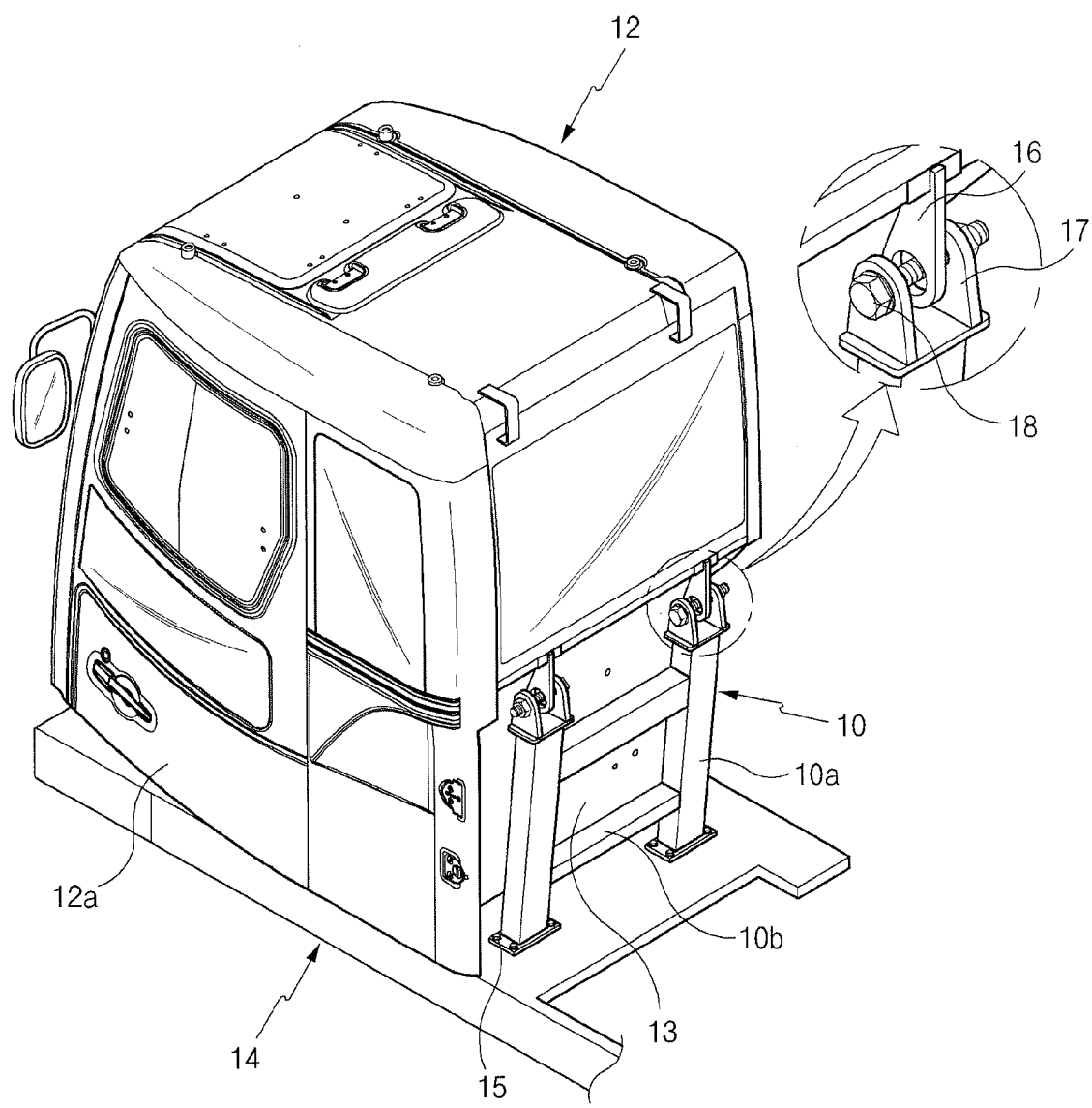
FIG. 4 is a perspective view of the construction equipment cab shown in FIG. 3.

As shown in FIGS. 3 and 4, according to an exemplary embodiment of the present invention, a construction equipment cab having a protective structure, in which the cab is mounted on an upper swivel body, and the protective structure is mounted on the cab and the upper swivel body and protects an operator from the cab in a rollover accident, includes: a lower panel 13 provided at a rear lower portion of the cab 12 to be sunk in a forward direction in order to secure a space 11 in which the protective structure 10 is held; and means for fixing the protective structure 10 held in the space 11 to the upper swivel body 14 and the cab 12.

The fixing means includes: first fixing members (e.g. bolts) 15 for fixing a lower end of the protective structure 10, which has vertical members 10a and horizontal members 10b, to the upper swivel body 14; a pair of hooks 16 vertically fixed to a rear outer face of the cab 12 to be opposite to each other, and each having a coupling hole formed in a horizontal direction; brackets 17 installed on upper ends of the protective structure 10, supporting the hooks 16 on left and right sides of the cab, and each having coupling holes formed in a horizontal direction; and second fixing members (e.g. bolts) 18 coupled to the coupling holes horizontally formed in the hooks 16 and the brackets 17, and fastening the brackets 17 and the hooks 16 to fix the protective structure 10 to the cab 12.

The lower panel 13 is inclined upwardly toward the rear of the cab 12 at an upper portion thereof.

Among the numbers which have not yet been described in the figures, 12a indicates a door of the cab 12 which can swing open and closed, and 19 indicates a radiator mounted on the upper swivel body 14 at the rear of the cab 12.

Now, a configuration of the construction equipment cab having the protective structure according to an exemplary embodiment of the present invention will be described in detail with reference to the accompanying drawings.

As shown in FIG. 4, when the cab 12 is assembled on an assembly line. the lower end of the protective structure 10 is fixed onto the upper swivel body 14 at the rear of the cab 12 by the first fixing members 15. The coupling holes of the brackets 17, which are vertically formed at the upper end of the protective structure 10, are coaxially aligned with the coupling holes of the hooks 16, which are vertically fixed to the rear outer face of the cab 12. The second fixing members 18 are coupled to the coupling holes of the brackets 17 and the hooks 16 to fasten the brackets 17 to the hooks 16.

In this manner, the second fixing members 18 are coupled to the coupling holes of the hooks 16 and the brackets 17 formed in a horizontal direction to fasten the brackets 17 to the hooks 16, so that the protective structure 10 can be easily fixed to the rear outer face of the cab 12.

Thus, owing to simplification of the configuration of the protective structure 10 fixed to the cab 12, the total number of processes of assembling the cab 12 is reduced, so that it is possible to improve workability. (Conventionally, since the fastening members fixed to the protective structure are vertically inserted into and fastened to the hooks fixed to the cab, workability is lowered.)

At this time, the space 11 is defined at the rear lower portion of the cab 12 by the lower panel 13 provided at the rear lower portion of the cab 12 to be sunk in the forward direction. The upper portion of the lower panel 13 is inclined upwardly toward the rear of the cab 12, so that the protective structure 10 held in the space 11 is inclined backwardly.

In this manner, as the protective structure 10 is held in the space 11, a space to mount the radiator 19, etc. is secured at the rear of the cab 12. As a result, in the construction equipment in which the door 12a of the cab 12 can swing open and closed, a narrow space of the rear of the cab 12 can be well utilized.

Further, in the case in which the weight of the construction equipment is transmitted to the side, etc. of the cab 12 due to a rollover accident during work, a load is dispersed to the sides or top of the protective structure 10 through the second fixing members 18, because the upper end of the protective structure 10 is pivotally fixed to the hooks 16. Thus, it is possible to prevent the corresponding parts from being deformed and damaged, and to minimize impact transmitted to the operator to ensure safety.

According to exemplary embodiments of the present invention, a construction equipment cab having a protective structure provides the following advantages.

The protective structure is prevented from protruding backward from the cab, so that components such as a radiator, a battery, etc. can be easily mounted even in a narrow space in the rear of the cab of, for instance, construction equipment whose door can swing open and closed (e.g., the radiator can be mounted nearest to a rear outer face of the cab).

Due to simplification of configuration of the protective structure connected to the cab, it is possible to reduce production cost. Further, due to reduction of a time when the cab is assembled on an assembly line, it is possible to improve workability.

In the case in which the weight of construction equipment is transmitted to the side, etc. of the cab due to a rollover accident during work, a load is dispersed to the sides or top of the protective structure, so that it is possible to minimize deformation and damage to corresponding components and to ensure the safety of an operator.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A construction equipment cab having a protective structure, the construction equipment cab being mounted on an upper swivel body, the protective structure being mounted on the cab and the upper swivel body so as to protect an operator from the cab in a rollover accident, the construction equipment cab comprising:

a lower panel provided at a rear lower portion of the cab to be sunk in a forward direction in order to secure a space in which the protective structure is held; and means for fixing the protective structure held in the space to the upper swivel body and the cab;

wherein the fixing means comprises:

first fixing members for fixing a lower end of the protective structure to the upper swivel body;

a pair of hooks vertically fixed to a rear outer face of the cab to be opposite to each other, and each having a coupling hole formed in a horizontal direction;

brackets vertically installed on upper ends of the protective structure to support the hooks on left and right sides of the cab; and second fixing members coupled to the coupling holes horizontally formed in the hooks and the brackets to fix the protective structure to the cab.

2. The construction equipment cab of claim 1, wherein the lower panel is inclined upwardly toward the rear of the cab at an upper portion thereof.

* * * * *